(12) United States Patent
Foland et al.

(10) Patent No.: US 12,080,176 B2
(45) Date of Patent: *Sep. 3, 2024

(54) SYSTEMS AND METHODS FOR IN-FLIGHT RE-ROUTING OF AN ELECTRIC AIRCRAFT

(71) Applicant: BETA AIR, LLC, South Burlington, VT (US)

(72) Inventors: Steven J. Foland, South Burlington, VT (US); Lochie Ferrier, South Burlington, VT (US); Nick Warren, South Burlington, VT (US); John Palombini, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,974

(22) Filed: Dec. 19, 2022

(65) Prior Publication Data

US 2023/0154340 A1 May 18, 2023

Related U.S. Application Data

(63) Continuation of application No. 17/528,673, filed on Nov. 17, 2021, now Pat. No. 11,562,653.

(51) Int. Cl.
*G08G 5/00* (2006.01)
*B60L 58/00* (2019.01)
(Continued)

(52) U.S. Cl.
CPC ............ *G08G 5/0039* (2013.01); *B60L 58/24* (2019.02); *B64C 29/0091* (2013.01);
(Continued)

(58) Field of Classification Search
CPC .. G08G 5/0039; G08G 5/0069; G08G 5/0091; G08G 5/0021; G08G 5/0056;
(Continued)

(56) References Cited

U.S. PATENT DOCUMENTS

| 10,328,805 B1 | 6/2019 | Wyrobek et al. |
| 10,663,529 B1 | 5/2020 | Bolotski et al. |

(Continued)

FOREIGN PATENT DOCUMENTS

| WO | 2021041209 | 3/2021 |
| WO | 2021064387 | 4/2021 |

OTHER PUBLICATIONS

Falck et al., Trajectory Optimization of Electric Aircraft Subject to Subsystem Thermal Constraints, Jun. 2, 2017.
(Continued)

*Primary Examiner* — Yonel Beaulieu
(74) *Attorney, Agent, or Firm* — Lee & Hayes, P.C.

(57) ABSTRACT

In an aspect of the present disclosure is a system for in-flight re-routing of an electric aircraft including a battery pack configured to provide electrical power to the electric aircraft; a sensor configured to detect at least a temperature metric of the battery pack and generate a temperature datum based on the at least a temperature metric; a controller communicatively connected to the sensor, the controller configured to: receive the temperature datum from the sensor; and re-route the electric aircraft based on the temperature datum.

20 Claims, 7 Drawing Sheets

(51) Int. Cl.
*B60L 58/10* (2019.01)
*B60L 58/24* (2019.01)
*B64C 29/00* (2006.01)
*B64C 39/02* (2023.01)
*B64U 50/19* (2023.01)

(52) U.S. Cl.
CPC ......... *B64C 39/024* (2013.01); *G08G 5/0069* (2013.01); *G08G 5/0091* (2013.01); *B60L 2200/10* (2013.01); *B60L 2260/56* (2013.01); *B64U 50/19* (2023.01)

(58) Field of Classification Search
CPC .......... G08G 5/025; G08G 5/00; B60L 58/24; B60L 2200/10; B60L 2260/56; B64C 29/0091; B64C 39/024; B64C 39/02; B64U 50/19; G01C 21/20; B64D 27/24
See application file for complete search history.

(56) References Cited

U.S. PATENT DOCUMENTS

| | | | |
|---|---|---|---|
| 10,960,785 B2 | 3/2021 | Villanueva et al. | |
| 10,976,170 B2 | 4/2021 | Morgan-Brown | |
| 10,981,469 B2 | 4/2021 | Muniz et al. | |
| 11,180,253 B1* | 11/2021 | Seeley | B64U 10/25 |
| 11,198,519 B1* | 12/2021 | Seeley | B64F 1/31 |
| 11,276,315 B1* | 3/2022 | Moeykens | H04B 7/185 |
| 11,562,653 B1* | 1/2023 | Foland | B60L 58/24 |
| 11,728,532 B1* | 8/2023 | Lohe | H01M 10/613 |
| | | | 429/120 |
| 2016/0236790 A1 | 8/2016 | Knapp et al. | |
| 2019/0101935 A1 | 4/2019 | Lai et al. | |
| 2020/0001996 A1 | 1/2020 | McAdoo | |
| 2020/0033921 A1* | 1/2020 | Rohena | H05K 7/20172 |
| 2020/0164763 A1 | 5/2020 | Holme | |
| 2020/0218270 A1 | 7/2020 | Gu et al. | |
| 2020/0290742 A1* | 9/2020 | Kumar | B64D 27/24 |
| 2020/0339010 A1* | 10/2020 | Villanueva | H01M 50/249 |
| 2020/0342772 A1 | 10/2020 | Mark et al. | |
| 2020/0391876 A1 | 12/2020 | Morrison | |
| 2020/0398992 A1* | 12/2020 | Morrison | H01M 8/0488 |
| 2021/0070457 A1 | 3/2021 | Wiegman | |
| 2021/0162864 A1 | 6/2021 | Furusawa et al. | |
| 2021/0201686 A1* | 7/2021 | Villa | G08G 1/005 |
| 2021/0309383 A1* | 10/2021 | Clark | B64C 29/0033 |
| 2021/0313804 A1* | 10/2021 | Wiegman | H02J 1/10 |
| 2021/0389381 A1* | 12/2021 | Kim | G01R 31/367 |
| 2021/0399381 A1* | 12/2021 | Jiang | H01M 50/417 |
| 2022/0052361 A1 | 2/2022 | Morrison | B60L 50/72 |
| 2022/0250508 A1* | 8/2022 | Donovan | B60L 58/26 |

OTHER PUBLICATIONS

Falck, R., Trajectory Optimization of Electric Aircraft Subject to Subsystem Thermal Constraints, AIAA Aviation Forum and Exhibition, Jun. 2017 (38 pages).

International Search Report and Written Opinion mailed Mar. 17, 2023 for corresponding International Application No. PCT/US22/49932 (24 pages).

* cited by examiner

SYSTEMS AND METHODS FOR IN-FLIGHT RE-ROUTING OF AN ELECTRIC AIRCRAFT

CROSS-REFERENCE TO RELATED APPLICATIONS

This application is a continuation of Non-Provisional application Ser. No. 17/528,673 filed on Nov. 17, 2021 and entitled "SYSTEMS AND METHODS FOR IN-FLIGHT RE-ROUTING OF AN ELECTRIC AIRCRAFT," issued as U.S. Pat. No. 11,562,653 on Jan. 24, 2023, the entirety of which is incorporated herein by reference.

FIELD OF THE INVENTION

The present invention generally relates to the field of electric aircraft. In particular, the present invention is directed to systems and methods for in-flight re-routing of an electric aircraft.

BACKGROUND

Batteries used in electric aircraft often overheat and can cause damage to the electric aircraft and create an unsafe environment for a user. Electric aircraft may be limited in re-routing while in-flight to find and land at a nearby landing site.

SUMMARY OF THE DISCLOSURE

In an aspect of the present disclosure is a system for in-flight re-routing of an electric aircraft including a battery pack configured to provide electrical power to the electric aircraft; a sensor configured to detect at least a temperature metric of the battery pack and generate a temperature datum based on the at least a temperature metric; a controller communicatively connected to the sensor, the controller configured to: receive the temperature datum from the sensor; and re-route the electric aircraft, while the electric aircraft is in-flight, based on the temperature datum and a user input.

In another aspect of the present disclosure is a method for implementing a system for in-flight re-routing of an electric aircraft including receiving, at a controller from a sensor installed in an electric aircraft, a temperature datum based on at least a temperature metric of a battery pack; and re-routing, by the controller and while the electric aircraft is in-flight, the electric aircraft based on the temperature datum and a user input.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for in-flight re-routing of an electric aircraft. In an embodiment, aspects of the present disclosure are systems and methods for in-flight re-routing on an electric aircraft based on the temperature of a battery pack as measured by a sensor. The electric aircraft may be re-routed to a landing site.

Aspects of the present disclosure can be used to avoid unsafe flight or damage to an electric aircraft caused by an overheating battery pack. Aspects of the present disclosure can also be used to find and re-route the electric aircraft to a suitable landing site. This is so, at least in part, because a controller may be configured to select a suitable landing site from possible locations. A suitable landing site may be selected based upon, among other factors, the landing site's proximity to the current location of the electric aircraft and the temperature of the battery pack. Exemplary embodiments illustrating aspects of the present disclosure are described below in the context of several specific examples.

"Communicatively connected," for the purposes of this disclosure, is a process whereby one device, component, or circuit is able to receive data from and/or transmit data to another device, component, or circuit. Communicative connection may be performed by wired or wireless electronic communication, either directly or by way of one or more intervening devices or components. In an embodiment, communicative connection includes electrically connection an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical connection, or the like. In an embodiment, communicative connecting may include electrically connecting an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical connection, or the like.

Figure 1:
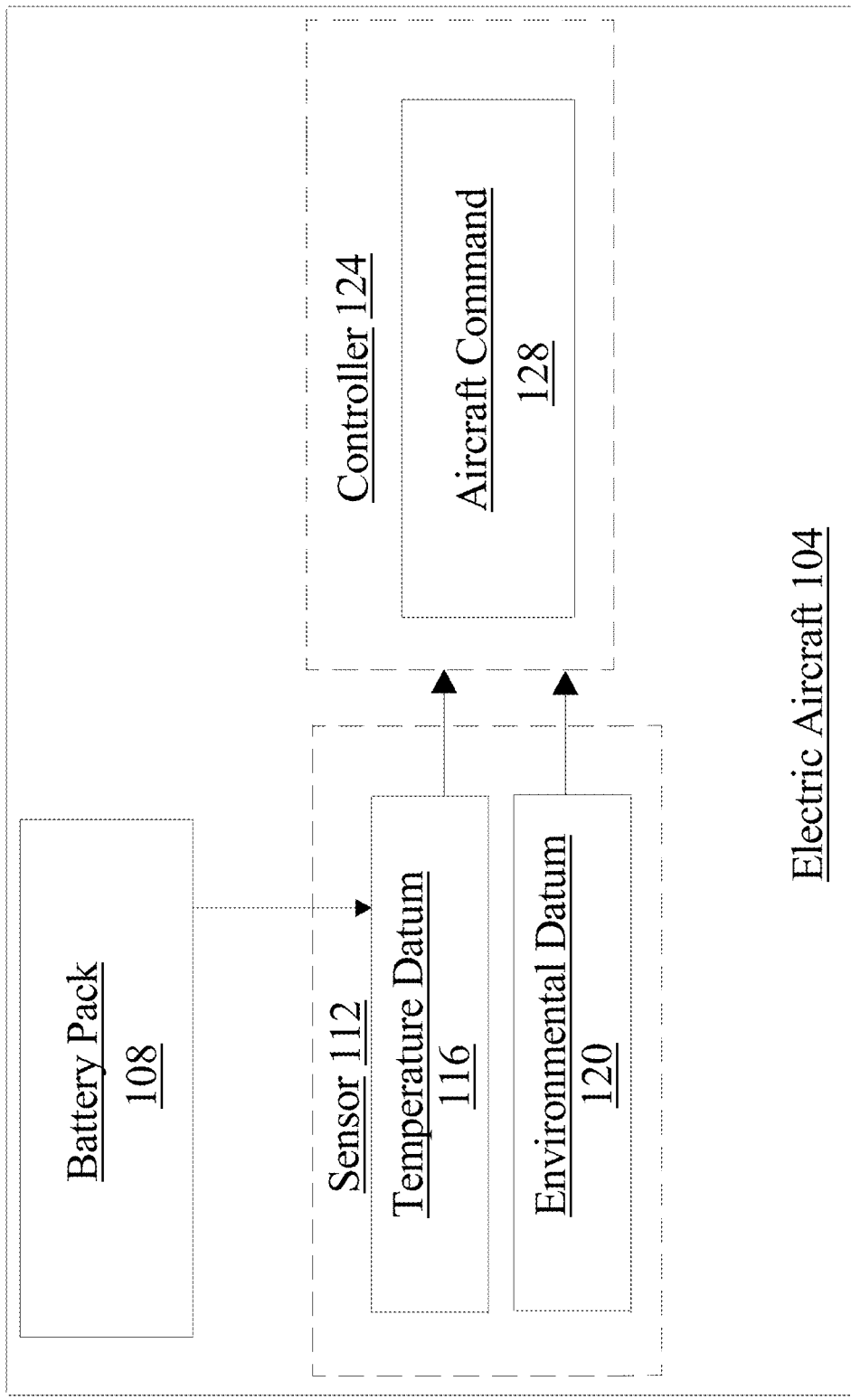
FIG. 1 is a block diagram of an exemplary system for in-flight re-routing of an electric aircraft according to an embodiment of the present disclosure.

Referring now to FIG. 1, an exemplary embodiment of system 100 for in-flight re-routing of an electric aircraft 104 is illustrated. Electric aircraft 104 may be powered by one or more electric motor. Electric aircraft 104 may include electrical vertical takeoff and landing (eVTOL) aircraft, helicopter, unmanned electric aircrafts (UAVs), drones, rotorcraft, commercial aircraft, and/or the like. Electric aircraft 104 may include one or more components that generate lift, including without limitation wings, airfoils, rotors, propellers, jet engines, or the like, or any other component or feature that an aircraft may use for mobility during flight.

Still referring to FIG. 1, system 100 includes a battery pack 108 configured to provide electrical power to electric aircraft 104. Battery pack 108 may include one or more battery modules, which each may include one or more battery cells, as discussed in detail below. Each battery cell may include an electrochemical cell such as, for example, a lithium ion cell. Battery pack 108 may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Pouch cells 604A-B may include lead-based batteries such as without limitation lead acid batteries and lead carbon batteries. Pouch cells 604A-B may include lithium sulfur batteries, magnesium ion batteries, and/or sodium ion batteries. Batteries may include solid state batteries or supercapacitors or another suitable energy source. Batteries may be primary or secondary or a combination of both. Battery pack 108 may be consistent with disclosure of battery pack in U.S. patent application Ser. No. 17/348,960 filed on Jun. 16, 2021 and titled "BATTERY PACK FOR ELECTRIC VERTICAL TAKE-OFF AND LANDING AIRCRAFT", which is incorporated in its entirety herein by reference. Additional disclosure related to batteries and battery modules may be found in U.S. patent application Ser. No. 16/948,140 filed on Sep. 4, 2020 and titled "SYSTEM AND METHOD FOR HIGH ENERGY DENSITY BATTERY MODULE" and U.S. patent application Ser. No. 16/590,496 filed on Oct. 2, 2019 and tilted "SYSTEMS AND METHODS FOR RESTRICTING POWER TO A LOAD TO PREVENT ENGAGING CIRCUIT PROTECTION DEVICE FOR AN AIRCRAFT"; the entirety of both applications are incorporated herein by reference.

With continued reference to FIG. 1, system 100 includes a sensor 112 configured to detect at least a temperature metric of battery pack 108 and generate a temperature datum 116 based on at least a temperature metric. As used in this disclosure, a "sensor" is a device that is configured to detect an input and/or a phenomenon and transmit information related to the detection; sensor 112 may include one or more sensors. For example, and without limitation, sensor 112 may transduce a detected phenomenon, such as at least a temperature metric. As used in this disclosure, a "temperature metric" is a temperature phenomenon of battery pack 108 or of a component of the battery pack 108 such as one or more battery modules and/or one or more battery cells. Temperature metric may include a rate of temperature change. As used in this disclosure, "temperature datum" is an element of data encoding one or more temperature metrics in an electrical signal such as a binary, analog, pulse width modulated, or other signal. Sensor 112 may be configured to communicate the information to a computing device such as a controller. Sensor 112 may be mechanically and/or communicatively connected to electric aircraft 104. Sensor 112 may be incorporated into electric aircraft 104 or be remote. Sensor 112 may be a contact sensor wherein it is electrically and/or mechanically connected to an object for detection or it may be a contactless sensor. In one or more embodiments, sensor 112 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 112, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection. Sensor 112 may be a contact or a non-contact sensor. For instance, and without limitation, sensor 112 may be connected to motor and/or a computing device. In other embodiments, sensor 112 may be remote to battery pack 108 and/or a computing device. As discussed further in this disclosure below, a computing device may include a processor, a pilot control, a controller, such as a flight controller, and the like. In one or more embodiments, sensor 112 may transmit/receive signals to/from a computing device. Signals may include electrical, electromagnetic, visual, audio, radio waves, or another undisclosed signal type alone or in combination.

Still referring to FIG. 1, sensor 112 may measure the health of a battery and circuitry electrically connected to the battery. Sensor 112 may include a sensor suite which may include a plurality of sensors that may detect similar or unique phenomena, as discussed below. For example, in a non-limiting embodiment, a sensor suite may include a plurality of voltmeters or a mixture of voltmeters and thermocouples. System 100 may include a plurality of sensors in the form of individual sensors or a sensor suite, as discussed below, working in tandem or individually. A sensor suite may include a plurality of independent sensors, as described in this disclosure, where any number of the described sensors may be used to detect any number of physical or electrical quantities associated with an electrical power source such as a battery. Independent sensors may include separate sensors measuring physical or electrical quantities that may be powered by and/or in communication with circuits independently, where each may signal sensor output to a control circuit. For example, sensor suite may measure a battery temperature and a battery charge level. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

Still referring to FIG. 1, in one or more embodiments, sensor 112 may include, as an example and without limitation, an environmental sensor. As used herein, an environmental sensor may be used to detect at least an environmental metric and generate an environmental datum 120 based on at least an environmental metric. As used in this disclosure, an "environmental metric" is a phenomenon associated with an environment external to an electric aircraft 104 such as weather conditions and includes an aircraft's location. Environmental metric may include measurements of ambient temperature, barometric pressure, air velocity, motion, various magnetic, humidity, wind velocity, oxygen, and/or location of electric aircraft 104. As used in this disclosure, "environmental datum" is an element of data representing environmental metric. Environmental sensor may include one or more motion sensors such as which may include gyroscopes, accelerometers, and inertial measurement unit (IMU). An environmental sensor may include a geospatial sensor. As used in this disclosure, a geospatial sensor may include optical/radar/Lidar, Global Positioning System (GPS), and may be used to detect electric aircraft 104 location including longitude and latitude, electric aircraft 104 speed, electric aircraft 104 altitude and whether the electric aircraft 104 is on the correct location of the flight plan. In an embodiment, an environmental sensor may sense one or more environmental conditions or parameters outside electric aircraft 104, inside the electric aircraft 104, or within or at any component thereof, including without limitation an energy source, a propulsor, or the like. The environmental sensor may further collect environmental information from the predetermined landing site, such as ambient temperature, barometric pressure, air velocity, motion sensors which may include gyroscopes, accelerometers, inertial measurement unit (IMU), various magnetic, humidity, and/or oxygen. The information may be collected from outside databases and/or information services, such as Aviation Weather Information Services. Sensor 112 may detect an environmental parameter, a temperature, a barometric pressure, a location parameter, and/or other necessary measurements. Environmental sensor may include a wind sensor. In some embodiments, wind sensor may be configured to measure a wind metric and generate a wind datum based on wind metric. A "wind datum" may include data of wind forces acting on an electric aircraft 104. Wind datum may include wind strength, direction, shifts, duration, or the like. For example, and without limitations, sensor 112 may include an anemometer. An anemometer may be configured to detect a wind speed. In one or more embodiments, the anemometer may include a hot wire, laser doppler, ultrasonic, and/or pressure anemometer.

Still referring to FIG. 1, sensor 112 is communicatively connected to a controller 124 so that sensor 112 may transmit signals including temperature datum 116 and/or environmental datum 120. Controller 124 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 124 may include a single computing device operating independently, or may include two or more computing device operating in concert, in parallel, sequentially or the like; two or more computing devices may be included together in a single computing device or in two or more computing devices. Controller 124 may interface or communicate with one or more additional devices as described below in further detail via a network interface device. Network interface device may be utilized for connecting controller 124 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 124 may include but is not limited to, for example, a computing device or cluster of computing devices in a first location and a second computing device or cluster of computing devices in a second location. Controller 124 may include one or more computing devices dedicated to data storage, security, distribution of traffic for load balancing, and the like. Controller 124 may distribute one or more computing tasks as described below across a plurality of computing devices of computing device, which may operate in parallel, in series, redundantly, or in any other manner used for distribution of tasks or memory between computing devices. Controller 124 may be implemented using a "shared nothing" architecture in which data is cached at the worker, in an embodiment, this may enable scalability of system 100 and/or computing device.

With continued reference to FIG. 1, controller 124 may be designed and/or configured to perform any method, method step, or sequence of method steps in any embodiment described in this disclosure, in any order and with any degree of repetition. For instance, controller 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, controller 124 is configured to receive temperature datum 116 from sensor 112 and re-route electric aircraft 104 based on the temperature datum 116. Controller 124 may be configured to re-route electric aircraft 104 once temperature datum 116 indicates that battery pack 108 or a component of battery pack 108 such as at least a battery module or at least a battery cell has a temperature at or higher than a threshold temperature. As used in this disclosure, "threshold temperature" is a specified temperature that triggers an automatic response by controller 124 if temperature datum 116 indicates that battery pack 108 reaches or exceeds the specified temperature. Similarly, controller 124 may be configured to re-route electric aircraft 104 once temperature datum 116 indicates that battery pack 108 or a component of battery pack 108 such as at least a battery module or at least a battery cell has a rate of temperature change at or greater than a threshold rate of temperature change. As used in this disclosure, "threshold rate of temperature change" is a specified temperature change rate that triggers an automatic response by controller 124 if temperature datum 116 indicates that a rate of temperature change of battery pack 108 reaches or exceeds the specified temperature change rate. Threshold temperature and/or threshold rate of temperature change may be a pre-set quantity with controller 124. In some embodiments, controller 124 may be configured to receive a user input to set or change threshold temperature and/or threshold rate of temperature change. Controller 124 may be configured to provide an alert to user once temperature of battery pack 108 reaches threshold temperature and/or once rate of temperature change of the battery pack 108 reaches threshold rate of temperature change. For example, controller 124 may be communicatively connected to a display, speakers, pilot controls, and/or pilot seat to provide a visual warning, audible warning, and/or a haptic warning. Warning may be onboard electric aircraft 104 and/or at a remote site. Warning may include the current temperature and/or rate of temperature change of battery pack 108; the amount it exceeds the temperature threshold and/or threshold rate of temperature change; a calculated amount of time and/or distance for electric aircraft 104 to travel before the electric aircraft 104 becomes unsafe, damaged, and/or inoperable; recommended actions for pilot to take; and/or a description of an automated response by controller 124. Threshold temperature and/or threshold rate of temperature change may represent a point on a temperature increase graph that represents a probable increase in temperature of battery pack 108 and, thus, indicating an unsatisfactory temperature trajectory. For example, temperature datum 124 may indicate a current temperature and rate of temperature change of battery pack 108 based on which controller 124 may determine that the battery pack 108 will reach and/or exceed threshold temperature before electric aircraft 104 reaches a destination according to a flight plan.

With continued reference to FIG. 1, controller 124 may be configured to provide in-flight estimation of how long electric aircraft 104 can maintain flight based on temperature and/or rate of temperature change of battery pack 108. Estimation may include the necessary landing at the end of flight. Estimation may be based on the type of landing that will be performed, such as fixed-wing landing or rotor-based landing, which may be determined by landing site that is selected or to be selected. Controller 124 may be configured to recommend landing site based on estimation. In some embodiments, controller 124 may be configured to identify multiple threshold temperatures, each with different automatic responses. For example, if battery pack 108 reaches a first threshold temperature, controller 124 may issue a warning as discussed above; if battery pack 108 reaches a second threshold temperature, the controller 124 may update re-route flight plan of electric aircraft 104 and re-route it to land at a landing site closer to the current position of electric aircraft 104 than a landing site in the original flight plan is to the current position of the electric aircraft 104. Controller 124 may have one or more alternative flight plans stored in a memory that is within controller 124 or otherwise communicatively connected to controller 124. Controller 124 may be configured to alter a current flight plan of electric aircraft 104 to one of the alternative flight plans if temperature datum 116 shows that battery pack 108 temperature reaches a threshold temperature and/or threshold rate of temperature change. For example, controller 124 may be configured to re-route electric aircraft 104 and alter a current flight plan of the electric aircraft 104 to one of the alternative flight plans if temperature datum 116 indicates that a temperature of battery pack 108 will exceed a threshold temperature before a destination is reached. Controller 124 may determine that temperature of battery pack 108 may reach threshold temperature before a destination of a current flight plan is reached based on temperature datum 116 identifying a current temperature and rate of temperature change of the battery pack 108.

With continued reference to FIG. 1, controller 124 may be configured to re-route electric aircraft 104 to a landing site based on temperature datum 116 received from sensor 112. As used in this disclosure, "landing site" is a location that is suitable for an electric aircraft 104 to land. For example, a landing site for an eVTOL may include a landing pad or other relatively horizontal surface that could function as a landing pad. Landing site may include a landing pad; a helipad; runway; locations at an airport such as a runway, landing pad, and an open vacant area like an area adjacent to hangars; recharging station; and the like. Electric aircraft 104 may be configured for fixed-wing landing and/or vertical rotor-based landing, wherein fixed-wing landing may require less battery power than a vertical rotor-based landing. Controller 124 may be configured to access one or more databases that include potential landing sites. Controller 124 may re-route electric aircraft 104 based also on environmental datum 120. Controller 124 may determine or receive environmental datum 120 from sensor 112, such as one or more geospatial sensors. For instance, and without limitation, environmental datum 120 may include a current position of electric aircraft 104 (also referred to in this disclosure as a "current aircraft position"). A current aircraft position may include a geographical moment of electric aircraft 104. For example, and without limitations, current position of electric aircraft 104 may include a geographical location and/or an orientation of electric aircraft 104. A current aircraft location may include any data describing a geographical moment of electric aircraft 104 at present time. Current aircraft location may be continually received by controller 124 so that the geographical moment of electric aircraft 104 is always known by controller 124 or a user, such as a pilot. In one or more embodiments, a current aircraft position may be provided by, for example, a global positioning system (GPS). Controller 124 may be configured to select a landing site. Controller 124 may update the flight plan to direct electric aircraft 104 to the selected landing site.

With continued reference to FIG. 1, controller 124 may be configured to select a landing site to re-route to based on the severity of the battery pack 108 temperature. For example, controller 124 may be configured to have multiple temperature thresholds and/or multiple threshold rate of temperature changes identifying different degrees of severity of temperature and/or rate of temperature change of battery pack 108. A first temperature threshold may be lower than a second temperature threshold. Similarly, a first rate of temperature change may be less than a second rate of temperature change. Controller 124 may be configured to select landing site based on which threshold is reached and, therefore, based on the severity of the temperature and/or rate of temperature change of battery pack 108. Controller 124 may be configured to score the desirability of a landing site as a function of, for example, proximity to another location such as the original landing site in the original flight plan, a charging station, and/or a location to house electric aircraft 104; type of landing site such as landing pad, airport, recharging station, runway, etc.; quality of the landing site such as factors relating to overuse, maintenance/conditions, traffic, and fees for using landing site; and/or whether the landing site can accommodate a fixed-wing landing, a rotor-based landing, or both. Controller 124 may select landing site based on temperature datum 116, current aircraft position, and desirability score of landing site. For example, controller 124 may select landing site based on the severity of temperature and/or rate of temperature change of battery pack 108 by determining which temperature threshold and/or threshold rate of temperature change is reached as shown by temperature datum 116, current aircraft position as determined by environmental datum 120, and desirability score of landing site. For example, controller 124 may select a landing site that is not the nearest landing site if it has a higher desirability score than the nearest landing site and temperature and/or rate of temperature change of battery pack 108 has reached a first threshold, but not a second threshold. Controller 124 may select the nearest landing site, regardless of desirability score, if temperature and/or rate of temperature change of battery pack 108 has reached a second threshold. For example, in embodiments where the electric aircraft is capable of vertical rotor-base landing and fixed-wing landing, controller 124 may select landing site that can accommodate a fixed-wing landing as this requires less power and may increase the battery pack 108 temperature less than a rotor-based landing would. Thus, re-routing may include changing landing from a vertical rotor-based mode to a fixed-wing mode and replacing an original flight plan with landing site for rotor-based landing such as a landing pad to a revised flight plan with landing site to accommodate a fixed-wing landing such as a runway.

Still referring to FIG. 1, controller 124 may be communicatively connected to an input control configured to receive user input. Input control may include a touch screen, keyboard, and/or any other inputs known by one skilled in the art. Input control may be onboard electric aircraft 104 and/or remote for a user to input information remotely. Controller 124 may be configured to select and list multiple landing sites for a user to choose. User may choose a landing site via input control. A list of multiple landing sites may include information about each landing site including distance between landing site and current aircraft position; type of landing site such as landing pad, airport, recharging station, runway, etc.; and/or whether the landing site can accommodate a fixed-wing landing, a rotor-based landing, or both. Controller 124 may be configured to identify a recommended landing site among listed landing sites as a function of temperature datum 116, datum representing a remaining charge of battery pack 108, and/or environmental datum 120 such as current aircraft position.

With continued reference to FIG. 1, controller 124 may be configured to generate, as a function of temperature datum 116, datum representing a remaining charge of battery pack 108, and/or environmental datum 120, an aircraft command 128. An "aircraft command", for the purposes of this disclosure, is an electronic signal representing at least an element of data correlated to pilot and/or controller 124 input representing a desired operation of a flight component of an aircraft. Aircraft command 128 may be configured to execute re-route of electric aircraft 104. Aircraft command 128 may include un updated flight plan for electric aircraft 104. In one or more embodiments, aircraft command 128 may be an attitude command. Aircraft command 128 may include a command datum that is transmitted to a flight component, such as one or more propellers. Aircraft command 128 may be a signal to change the heading or trim of electric aircraft 104. Aircraft command 128 may be a signal to change an aircraft's pitch, roll, yaw, or throttle. Aircraft trajectory is manipulated by one or more flight components, such as control surfaces, and propulsors working alone or in tandem consistent with the entirety of this disclosure. "Throttle", for the purposes of this disclosure, refers to an aircraft outputting an amount of thrust from a propulsor. Aircraft command 128 may include an electrical signal. Aircraft command 128 may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal.

Still referring to FIG. 1, controller 124 may include a processor. A processor may include an artificial intelligence configured to process data from sensor 112. In some embodiments, the processor may include a machine-learning model configured to process datum from sensor 112 or user input. A processor may be configured to output an optimal flight trajectory to flight controller 124 of electric aircraft 104. An optimal flight trajectory may include a flight plan to provide wind compensation. Wind-compensated flight trajectory may include a function of aerodynamics and propulsion systems of electric aircraft 104. For example, a function of thrust coefficients may be included, as discussed further below in this disclosure. In one or more embodiments, a processor may be in communication with controller 124. In some embodiments, a processor may be configured to transmit data to controller 124. In some embodiments, data may include a flight plan, flight commands, flight alerts, temperature datum 116 and/or environmental datum 120. In some embodiments, controller 124 may be in communication with sensor 112. Thus, controller 124 may update flight controls, plans, and projected trajectory of electric aircraft 104 based on data from sensor 112. In some embodiments, controller 124 may update flight controls, plans, and projected trajectory of electric aircraft 104 based on an outside input, such as a user input.

Figure 2:
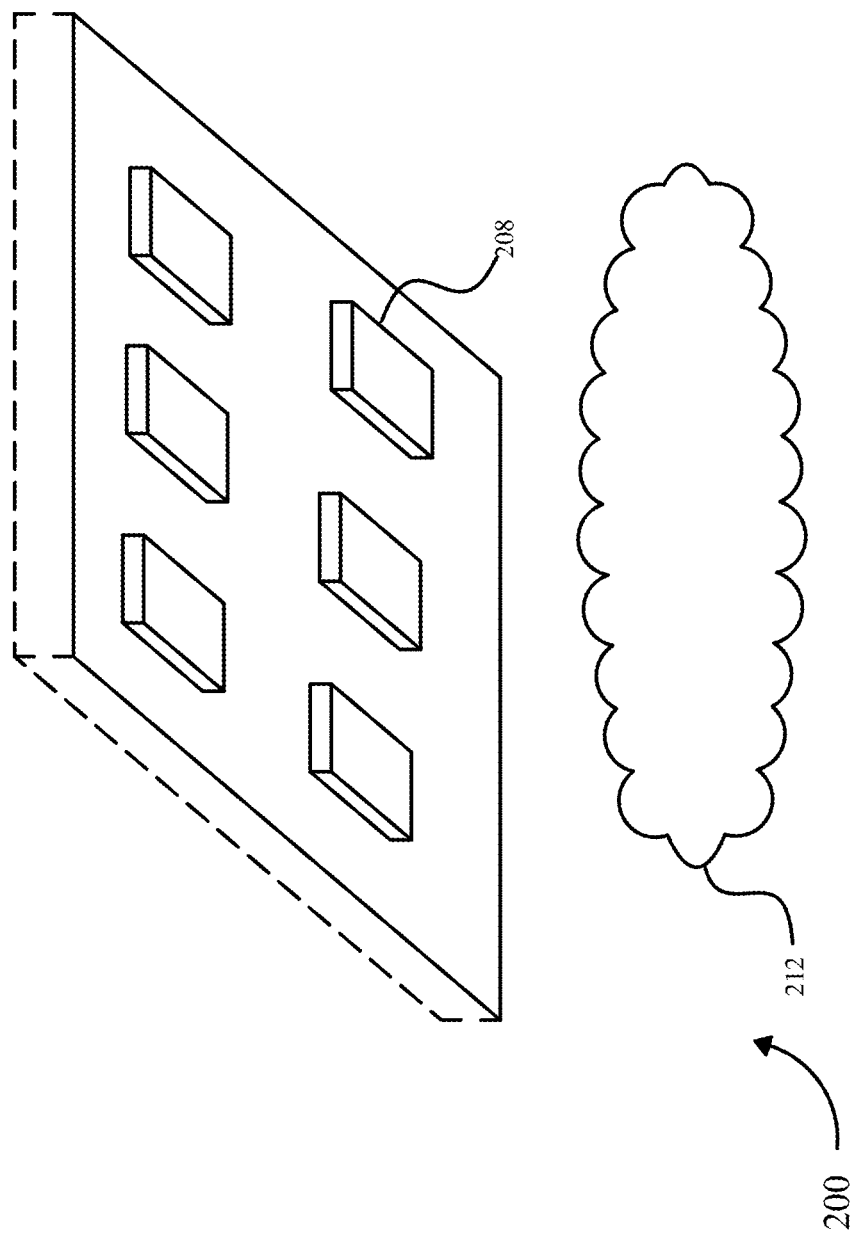
FIG. 2 is a schematic diagram illustrating an exemplary sensor suite according to an embodiment of the present disclosure.

Referring now to FIG. 2, an exemplary embodiment of sensor suite 200 is presented in accordance with one or more embodiments of the present disclosure. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors communicatively connected to a charging connection measuring operating conditions of the communication such as temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 112 to detect phenomenon is maintained.

Sensor suite 200 may include a moisture sensor 204. There are three primary measurements of humidity: absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 204 may be psychrometer. Moisture sensor 204 may be a hygrometer. Moisture sensor 204 may be configured to act as or include a humidistat. A "humidistat", for the purposes of this disclosure, is a humidity-triggered switch, often used to control another electronic device. Moisture sensor 204 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 2, sensor suite 200 may include electrical sensors 208. Electrical sensors 208 may be configured to measure voltage of a charging connection, electrical current of charging connection, and resistance of charging connection. Electrical sensors 208 may include separate sensors to measure each of the previously disclosed electrical characteristics such as voltmeter, ammeter, and ohmmeter, respectively. Sensor suite 200 may include a sensor or plurality thereof that may detect voltage and direct the charging of individual battery cells of a power source according to charge level; detection may be performed using any suitable component, set of components, and/or mechanism for direct or indirect measurement and/or detection of voltage levels, including without limitation comparators, analog to digital converters, any form of voltmeter, or the like. Sensor suite 200 and/or a control circuit incorporated therein and/or communicatively connected thereto may be configured to adjust charge to one or more battery cells as a function of a charge level and/or a detected parameter. For instance, and without limitation, sensor suite 200 may be configured to determine that a charge level of a battery cell of a power source is high based on a detected voltage level of that battery cell or portion of the power source and/or battery pack 108. Sensor suite 200 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 200 may include digital sensors, analog sensors, or a combination thereof. Sensor suite 200 may include digital-to-analog converters (DAC), analog-to-digital converters (ADC, A/D, A-to-D), a combination thereof, and the like.

With continued reference to FIG. 2, sensor suite 200 may include thermocouples, thermistors, thermometers, passive infrared sensors, resistance temperature sensors (RTD's), semiconductor based integrated circuits (IC), a combination thereof or another undisclosed sensor type, alone or in combination. For example, sensor suite 200 may include one or more temperature sensors to measure battery temperature.

With continued reference to FIG. 2, sensor suite 200 may include a sensor configured to detect gas that may be emitted during or after a cell failure. "Cell failure", for the purposes of this disclosure, refers to a malfunction of a battery cell of a power source, which may be an electrochemical cell, that renders the cell inoperable for its designed function, namely providing electrical energy to at least a portion of an electric aircraft 104. Byproducts of cell failure 212 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 200, may be configured to detect combustible, flammable, toxic, oxygen depleted, a combination thereof, or another type of gas alone or in combination. The gas sensor that may be present in sensor suite 200 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 200 may include sensors that are configured to detect non-gaseous byproducts of cell failure 212 including, in non-limiting examples, liquid chemical leaks including aqueous alkaline solution, ionomer, molten phosphoric acid, liquid electrolytes with redox shuttle and ionomer, and salt water, among others. Sensor suite 200 may include sensors that are configured to detect non-gaseous byproducts of cell failure 212 including, in non-limiting examples, electrical anomalies as detected by any of the previous disclosed sensors or components.

With continued reference to FIG. 2, sensors 208 may be disposed on a sense board 216. In one or more embodiments, sense board 216 may include opposing flat surfaces and may be configured to cover a portion of a battery module within a power source, such as a battery pack 108. Sense board 216 may include, without limitation, a control circuit configured to perform and/or direct any actions performed by sense board 216 and/or any other component and/or element described in this disclosure. Sense board 216 may be consistent with the sense board disclosed in U.S. patent application Ser. No. 16/948,140 entitled, "SYSTEM AND METHOD FOR HIGH ENERGY DENSITY BATTERY MODULE" and incorporated herein by reference in its entirety.

With continued reference to FIG. 2, sensor suite 200 may be configured to detect events where voltage nears an upper voltage threshold or lower voltage threshold. The upper voltage threshold may be stored in a memory of, for example, a computing device for comparison with an instant measurement taken by any combination of sensors present within sensor suite 200. The upper voltage threshold may be calculated and calibrated based on factors relating to battery cell health, maintenance history, location within battery pack 108, designed application, and type, among others. Sensor suite 200 may measure voltage at an instant, over a period of time, or periodically. Sensor suite 200 may be configured to operate at any of these detection modes, switch between modes, or simultaneous measure in more than one mode. Sensor 112 may detect through sensor suite 200 events where voltage nears the lower voltage threshold. The lower voltage threshold may indicate power loss to or from an individual battery cell or portion of battery pack 108. Sensor 112 may detect through sensor suite 200 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation. Additional disclosure related to a battery management system may be found in U.S. patent application Ser. Nos. 17/111,002 and 17/108,798 entitled "SYSTEMS AND METHODS FOR A BATTERY MANAGEMENT SYSTEM INTEGRATED IN A BATTERY PACK CONFIGURED FOR USE IN ELECTRIC AIRCRAFT", both of which are incorporated in their entirety herein by reference.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Figure 3:
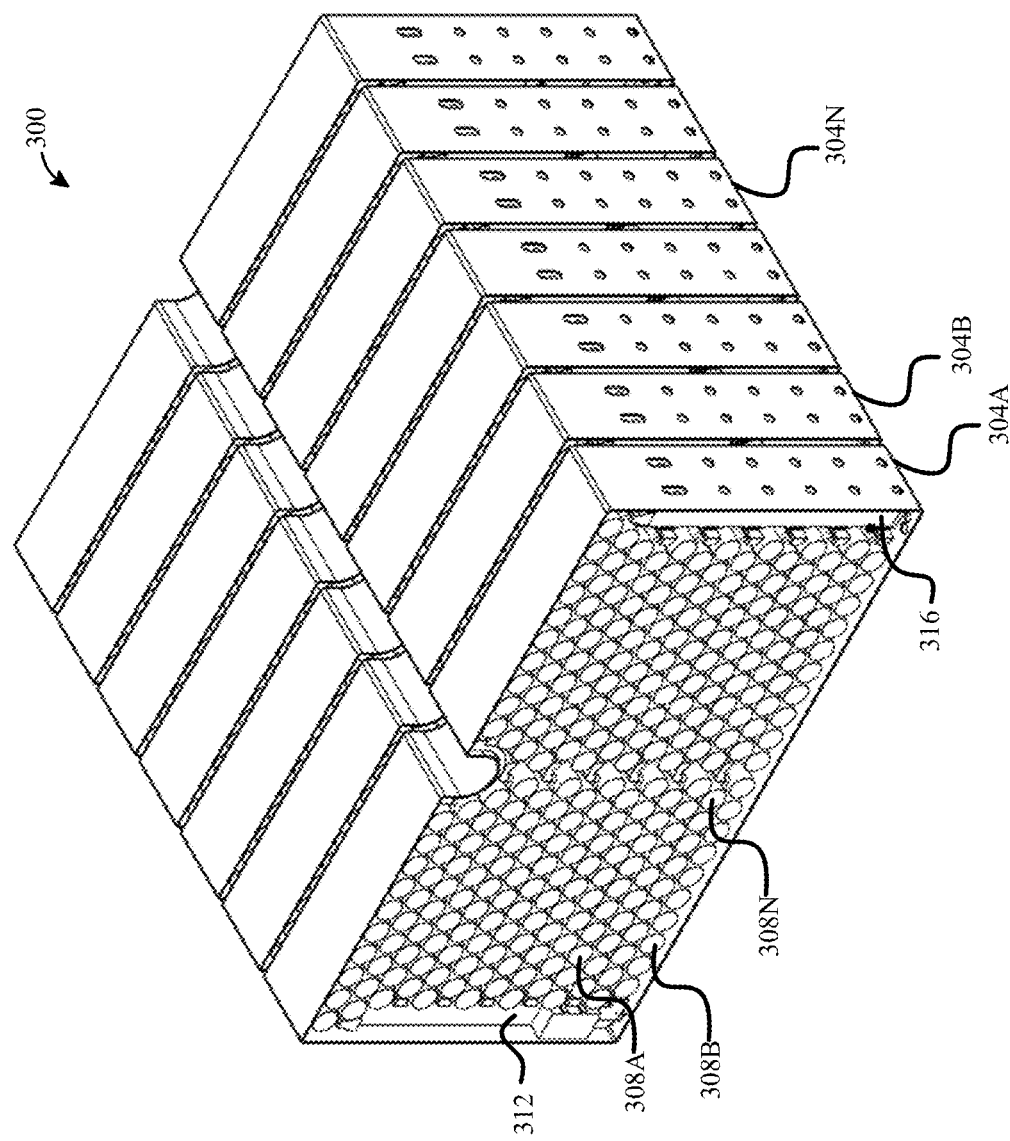
FIG. 3 is a schematic diagram illustrating an exemplary battery pack according to an embodiment of the present disclosure.

Referring now to FIG. 3, an exemplary embodiment of a battery pack 300 with a plurality of battery modules disposed therein is illustrated. The configuration of battery pack 300 is merely exemplary and should in no way be considered limiting. Battery pack 300 is configured to facilitate the flow of media through each battery module of the plurality of battery modules to cool the battery pack. Battery pack 300 may include one or more battery modules 304A-N. Battery pack 300 is configured to house and/or encase one or more battery modules 304A-N. Each battery module of the plurality of battery modules 304A-N may include any battery module as described in further detail in the entirety of this disclosure. As an exemplary embodiment, FIG. 3 illustrates 7 battery modules 304A-N creating battery pack 300, however, a person of ordinary skill in the art would understand that any number of battery modules 304A-N may be housed within battery pack 300. In an embodiment, each battery module of the plurality of battery modules 304A-N may include one or more battery cells 308A-N. Each battery module 304A-N may be configured to house and/or encase one or more battery cells 308A-N. Each battery cell of the plurality of battery cells 308A-N may include any battery cell as described in further detail in the entirety of this disclosure. Battery cells 308A-N may be configured to be contained within each battery module 304A-N, wherein each battery cell 308A-N is disposed in any configuration without limitation. As an exemplary embodiment, FIG. 3 illustrates 240 battery cells 308A-N housed within each battery module 304A-N, however, a person of ordinary skill in the art would understand that any number of battery units 308A-N may be housed within each battery module 304A-N of battery pack 300. Further, each battery module of the plurality of battery modules 304A-N of battery pack 300 includes circuit 312. Circuit 312 may include any circuit as described in further detail in the entirety of this disclosure. Each battery module of the plurality of battery modules 304A-N further includes second circuit 316. Second circuit 316 may include any circuit as described in further detail in the entirety of this disclosure. Persons skilled in the art, upon reviewing the entirety of this disclosure, will be aware of various configurations of the plurality of battery modules that may be utilized for the battery pack consistently with this disclosure.

With continued reference to FIG. 3, according to some embodiments, a battery unit may be configured to couple to one or more other battery units, wherein the combination of two or more battery units forms at least a portion of vehicle battery and/or charging battery. Battery unit may be configured to include a plurality of battery cells. The plurality of battery cells may include any battery cell as described in the entirety of this disclosure. In the instant embodiment, for example and without limitation, battery unit includes a first row of battery cells, wherein first row of battery cells is in contact with the first side of the thermal conduit, as described in further detail below. As a non-limiting example, row of battery cells is configured to contain ten columns of battery cells. Further, in the instant embodiment, for example and without limitation, battery unit includes a second row of battery cells, wherein second row of battery cells is in contact with the second side of the thermal conduit, as described in further detail below. As a non-limiting example, second row of battery cells is configured to contain ten columns of battery cells. In some embodiments, battery unit may be configured to contain twenty battery cells in first row and second row. Battery cells of battery unit may be arranged in any configuration, such that battery unit may contain any number of rows of battery cells and any number of columns of battery cells. In embodiments, battery unit may contain any offset of distance between first row of battery cells and second row of battery cells, wherein the battery cells of first row and the battery cells of second row are not centered with each other. In the instant embodiment, for example and without limitation, battery unit includes first row and adjacent second row each containing ten battery cells, each battery cell of first row and each battery cell of second row are shifted a length measuring the radius of a battery cell, wherein the center of each battery cell of first row and each battery cell of second row are separated from the center of the battery cell in the adjacent column by a length equal to the radius of the battery cell. As a further example and without limitation, each battery cell of first row and each battery cell of second row are shifted a length measuring a quarter the diameter of each battery cell, wherein the center of each battery cell of first row and each battery cell of second row are separated from the center of a battery cell in the adjacent column by a length equal to a quarter of the diameter of the battery cell. First row of battery cells and second row of battery cells of the at least a battery unit may be configured to be fixed in a position by utilizing a cell retainer, as described in the entirety of this disclosure. Each battery cell may be connected utilizing any means of connection as described in the entirety of this disclosure. In some embodiments, battery unit may include thermal conduit, wherein thermal conduit has a first surface and a second opposite and opposing surface. In some cases, height of thermal conduit may not exceed the height of battery cells, as described in the entirety of this disclosure. For example and without limitation, thermal conduit may be at a height that is equal to the height of each battery cell of first row and second row. Thermal conduit may be composed of any suitable thermally conductive material. Thermal conduit is configured to include an indent in the component for each battery cell coupled to the first surface and/or the second surface of thermal conduit. Persons skilled in the art, upon reviewing the entirety of this disclosure, will be aware of components that may be used as thermal conduits consistently with this disclosure.

Figure 4:
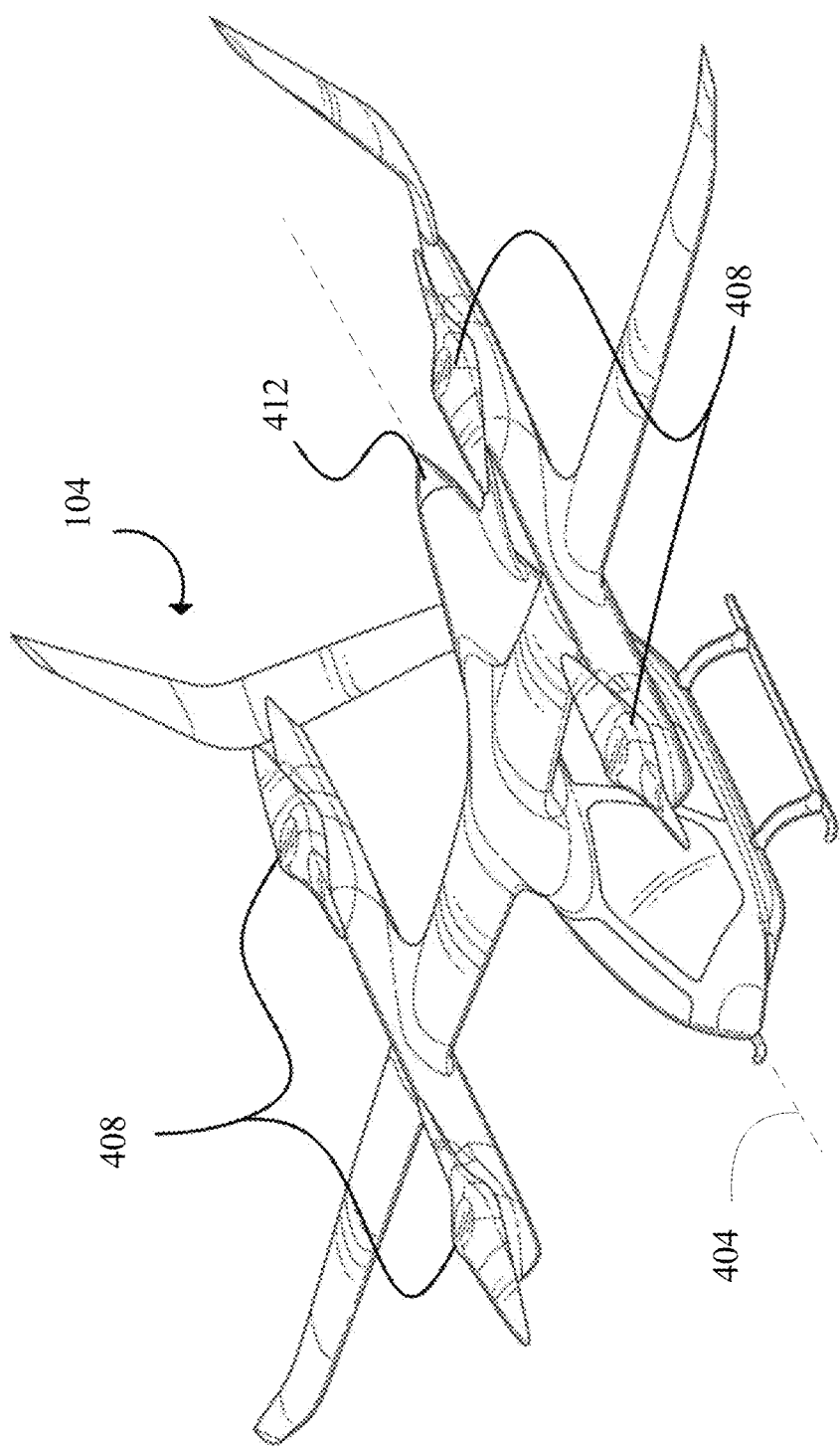
FIG. 4 a perspective view of an exemplary electric aircraft according to an embodiment of the present disclosure.

Referring now to FIG. 4, in one or more embodiments, electric aircraft 104 may include a vertical takeoff and landing aircraft (eVTOL). As used herein, a vertical take-off and landing (eVTOL) aircraft is an electrically powered aircraft that can take off and land vertically. An eVTOL aircraft may be capable of hovering. In order, without limitation, to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight is where the aircraft generates lift and propulsion by way of one or more powered rotors coupled with an engine, such as a "quad copter," helicopter, or other vehicle that maintains its lift primarily using downward thrusting propulsors. Fixed-wing flight, as described herein, is where the aircraft is capable of flight using wings and/or foils that generate life caused by an aircraft's forward airspeed and the shape of the wings and/or foils, such as in airplane-style flight. As used in this disclosure, "fixed-wing landing", also known as airplane-style landing, is a landing technique for an aircraft with fixed-wings in which the aircraft descends while continuing a forward motion, thus requiring a landing strip or a site with a minimum runway length to function as a landing strip.

With continued reference to FIG. 4, a number of aerodynamic forces may act upon electric aircraft 104 during flight. Forces acting on electric aircraft 104 during flight may include, without limitation, thrust, a forward force produced by a propulsor of electric aircraft 104, which may act parallel to a longitudinal axis 404 of electric aircraft 104. Another force acting upon electric aircraft 104 may include, without limitation, drag, defined as a rearward retarding force which is caused by disruption of airflow by any protruding surface of electric aircraft 104 such as, without limitation, a wing, rotor, and/or fuselage. Drag may oppose thrust and act rearward parallel to relative wind. A further force acting upon electric aircraft 104 may include, without limitation, weight, which may include a combined load of electric aircraft 104 itself, crew, baggage, and/or fuel. Weight may pull electric aircraft 104 downward due to the force of gravity. An additional force acting on electric aircraft 104 may include, without limitation, lift, which may act to oppose the downward force of weight and may be produced by a dynamic effect of air acting on an airfoil and/or downward thrust from a propulsor of electric aircraft 104. Lift generated by an airfoil may depend on speed of airflow, density of air, total area of the airfoil and/or a segment thereof, and/or an angle of attack between air and the airfoil. In a non-limiting example, electric aircraft 104 may be designed to be as lightweight as possible.

Referring still to FIG. 4, electric aircraft 104 may include at least a vertical propulsor 408 and at least a forward propulsor 412. At least a forward propulsor 412 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, take-off, and/or landing, and/or may propel electric aircraft 104 forward or backward on the ground. At least a vertical propulsor 408 and at least a forward propulsor 412 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically connected to the at least a first propulsor as a source of thrust.

With continued reference to FIG. 4, the generated optimal flight trajectory may result in aircraft command 128 being transmitted from controller 124 to flight components of electric aircraft 104. Aircraft command 128 may include a desired function of flight components to maintain trajectory of an aircraft despite wind forces acting on the aircraft. As previously mentioned, "flight components", for the purposes of this disclosure, include components related to and mechanically connected to an aircraft that manipulates a fluid medium in order to propel and maneuver the aircraft through the fluid medium.

Figure 5:
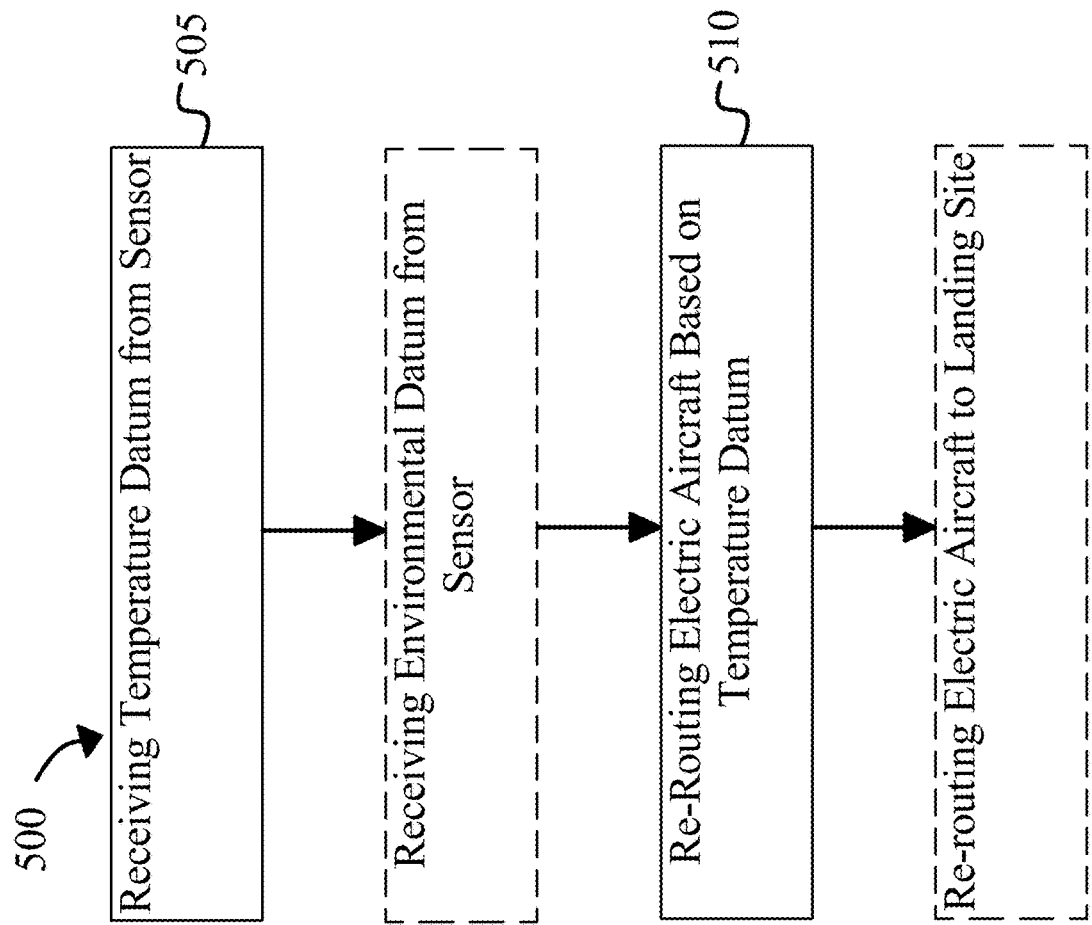
FIG. 5 is a flow diagram representing an exemplary method for implementing a system for in-flight re-routing of an electric aircraft according to an embodiment of the present disclosure.

Now referring to FIG. 5, an exemplary embodiment of a method 500 for in-flight re-routing of an electric aircraft is illustrated. At step 505, controller, receives from sensor temperature datum based on at least a temperature metric of battery pack; this may be implemented, without limitation, as described above in reference to FIGS. 1-5. Controller may also receive from sensor environmental datum based on at least an environmental metric. At least an environmental metric may include the current location of electric aircraft.

At step 510, controller re-routes electric aircraft based on temperature datum; this may be implemented, without limitation, as described above in reference to FIGS. 1-5. Re-routing may be based on whether the temperature datum indicates a temperature higher than a threshold temperature. Re-routing may be based on whether the temperature datum indicates a rate of temperature change greater than a threshold rate of temperature change. Controller may be configured to re-route electric aircraft to landing site. Controller may be configured to access a database of locations for possible landing sites. Selecting landing site may be based on the location of electric aircraft. Selecting landing site may be based on temperature datum. Electric aircraft may be an eVTOL aircraft. Electric aircraft may be configured to land with fixed-wing flight.

Figure 6:
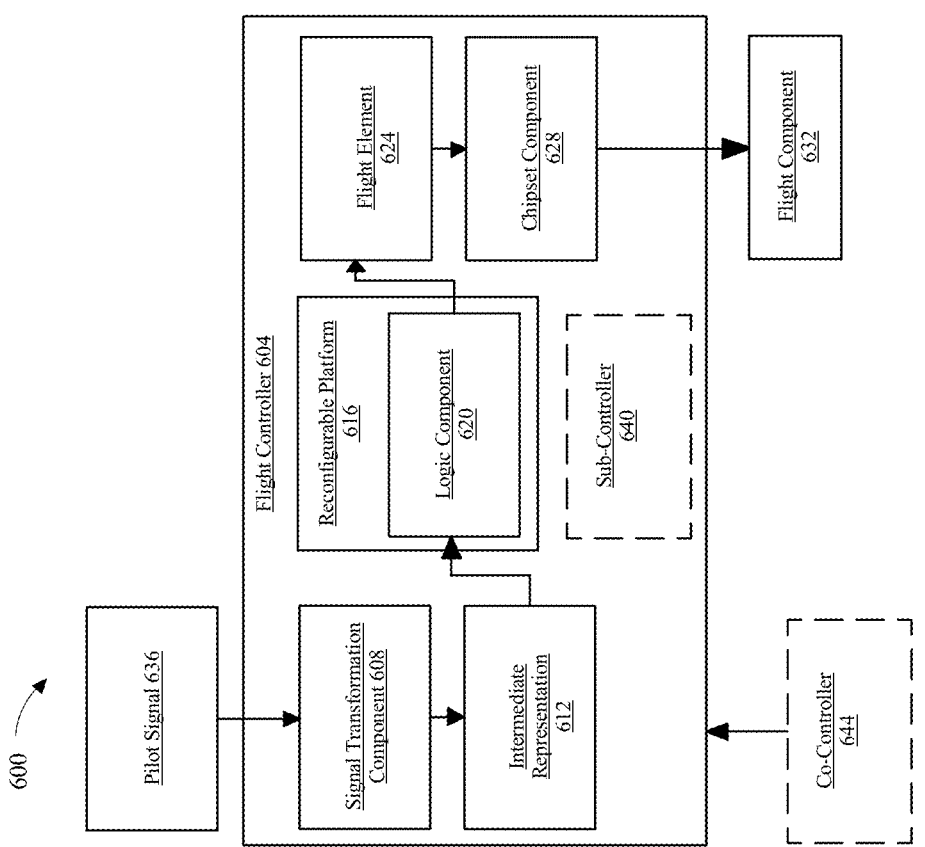
FIG. 6 is a block diagram of a flight controller according to an embodiment of the present disclosure.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
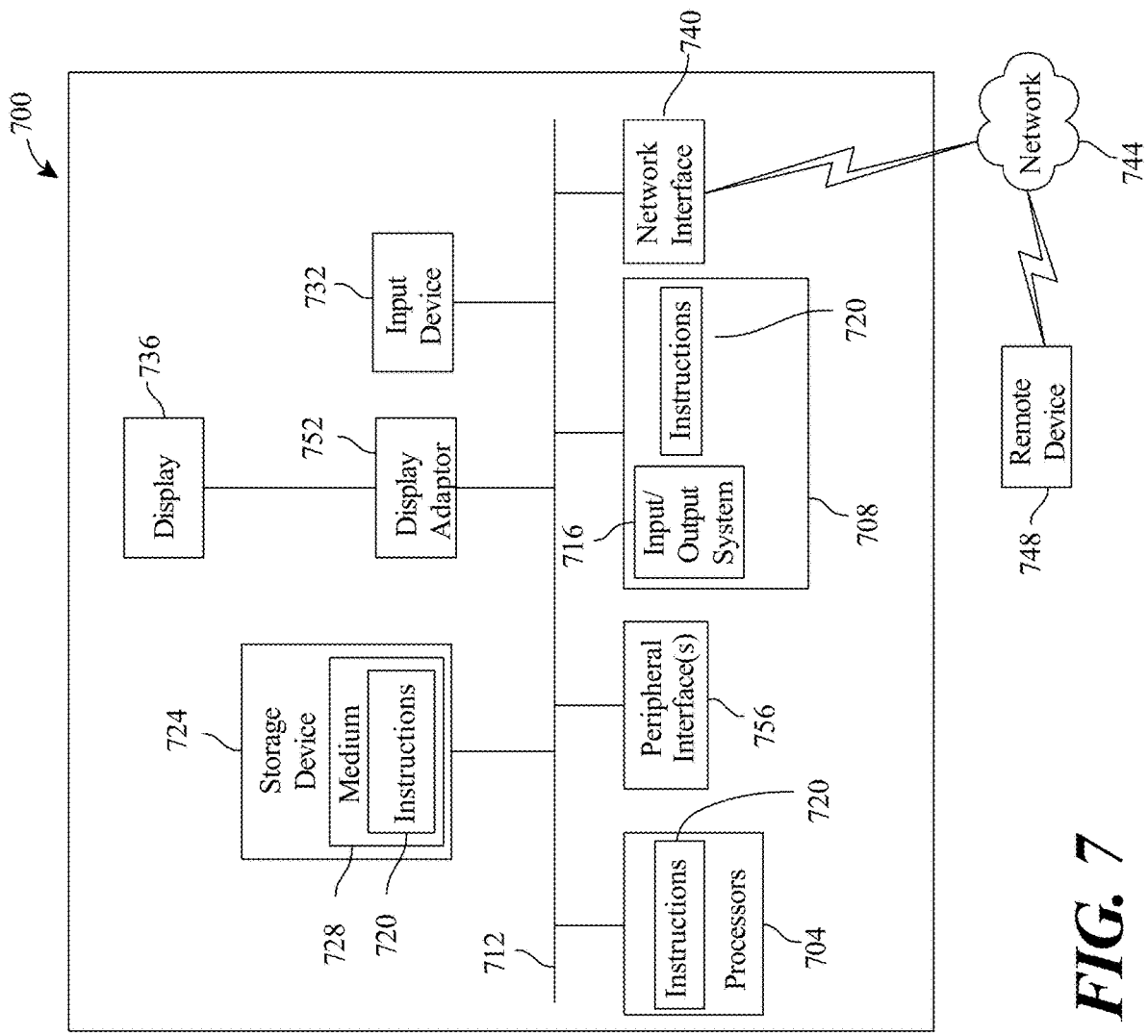
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for in-flight re-routing of an electric aircraft, comprising:
   a battery pack configured to provide electrical power to the electric aircraft;
   a sensor configured to generate a temperature datum according to a temperature of the battery pack; and
   a controller communicatively connected to the sensor, the controller configured to:
   receive the temperature datum from the sensor; and
   re-route the electric aircraft, while the electric aircraft is in-flight, based on the temperature datum.

2. The system of claim 1, wherein the controller is further configured to:
   recommend a plurality of landing sites as a function of the temperature datum; and
   receive a user input, wherein the user input contains a selection of a landing site of the plurality of landing sites.

3. The system of claim 2, wherein re-routing the electric aircraft comprises re-routing the electric aircraft to the landing site of the selection.

4. The system of claim 2, wherein recommending the plurality of landing sites as a function of the temperature datum comprises recommending the plurality of landing sites as a function of a distance between each landing site of the plurality of landing sites and a current aircraft position.

5. The system of claim 2, wherein recommending the plurality of landing sites as a function of the temperature datum comprises recommending the plurality of landing sites as a function of a type of landing site.

6. The system of claim 1, wherein the controller is further configured to
   issue a warning as a function of a comparison between the temperature datum and a threshold temperature.

7. The system of claim 6, wherein issuing the warning as a function of the comparison between the temperature datum and the first threshold temperature comprises issuing a visual warning as based at least in part on the comparison between the temperature datum and the threshold temperature using a display.

8. The system of claim 1, wherein re-routing the electric aircraft comprises updating a flight plan of the electric aircraft.

9. The system of claim 1, wherein re-routing the electric aircraft comprises updating a flight plan of the electric aircraft as a function of a user input.

10. The system of claim 1, wherein the controller is further configured to receive a user input from an input control, wherein the input control is:
communicatively connected to the controller; and
located remote to the electric aircraft.

11. A method for implementing a system for in-flight re-routing of an electric aircraft, the method comprising:
receiving, at a controller from a sensor installed in the electric aircraft, a temperature datum generated according to a temperature of a battery pack; and
re-routing, by the controller and while the electric aircraft is in-flight, the electric aircraft based on the temperature datum.

12. The method of claim 11, further comprising:
recommending, by the controller, a plurality of landing sites as a function of the temperature datum; and
receiving, by the controller, a user input, wherein the user input contains a selection of a landing site of the plurality of landing sites.

13. The method of claim 12, wherein re-routing the electric aircraft comprises re-routing the electric aircraft to the landing site of the selection.

14. The method of claim 12, wherein recommending the plurality of landing sites as a function of the temperature datum comprises recommending the plurality of landing sites as a function of a distance between each landing site of the plurality of landing sites and a current aircraft position.

15. The method of claim 12, wherein recommending the plurality of landing sites as a function of the temperature datum comprises recommending the plurality of landing sites as a function of a type of landing site.

16. The method of claim 11, further comprising
issuing, by the controller, a warning as a function of a comparison between the temperature datum and a threshold temperature.

17. The method of claim 16, wherein issuing the warning as a function of the comparison between the temperature datum and the first threshold temperature comprises issuing a visual warning based at least in part on the comparison between the temperature datum and the threshold temperature using a display.

18. The method of claim 11, wherein re-routing the electric aircraft comprises updating a flight plan of the electric aircraft.

19. The method of claim 11, wherein re-routing the electric aircraft comprises updating a flight plan of the electric aircraft as a function of a user input.

20. The method of claim 11, further comprising receiving, by the controller, a user input from an input control, wherein the input control is:
communicatively connected to the controller; and
located remote to the electric aircraft.

* * * * *